United States Patent
McVicker

(10) Patent No.: US 10,661,866 B1
(45) Date of Patent: *May 26, 2020

(54) SCUBA REGULATOR SYSTEM MOUNT SYSTEM

(71) Applicant: Michael W McVicker, Pensacola, FL (US)

(72) Inventor: Michael W McVicker, Pensacola, FL (US)

( * ) Notice: Subject to any disclaimer, the term of this patent is extended or adjusted under 35 U.S.C. 154(b) by 43 days.

This patent is subject to a terminal disclaimer.

(21) Appl. No.: 16/141,442

(22) Filed: Sep. 25, 2018

(51) Int. Cl.
*B63C 11/12* (2006.01)
*F16M 13/02* (2006.01)
*B63C 11/52* (2006.01)

(52) U.S. Cl.
CPC .............. *B63C 11/12* (2013.01); *B63C 11/52* (2013.01); *F16M 13/02* (2013.01); *B63C 2011/128* (2013.01)

(58) Field of Classification Search
CPC .... F16M 13/04; B63C 11/12; B63C 2011/128
See application file for complete search history.

(56) References Cited

U.S. PATENT DOCUMENTS

| | | | | | |
|---|---|---|---|---|---|
| 4,963,904 | A * | 10/1990 | Lee | ........................... | A45F 5/00 224/201 |
| 5,183,326 | A * | 2/1993 | Case | ....................... | A61F 9/029 224/181 |
| 8,857,775 | B1 * | 10/2014 | Clearman | ............ | G03B 17/561 24/334 |
| 8,870,475 | B1 * | 10/2014 | Bennett | ................ | G03B 17/561 396/419 |
| 9,019,431 | B2 * | 4/2015 | Phillips | ................. | H04N 5/2252 348/376 |
| 9,532,474 | B2 * | 12/2016 | Gutschenritter | ..... | H05K 5/0221 |
| 9,864,258 | B1 | 1/2018 | McVicker | | |
| 10,137,969 | B2 * | 11/2018 | Lin | .......................... | B63C 11/12 |
| 10,160,527 | B2 * | 12/2018 | Wung | ..................... | B63C 11/12 |
| 10,462,428 | B1 * | 10/2019 | Grabow | ............... | H04N 5/2252 |
| 10,509,239 | B2 * | 12/2019 | Knibbe | .................... | B63C 11/12 |
| 2007/0119888 | A1 * | 5/2007 | Chuang | ..................... | B62J 11/00 224/427 |
| 2010/0005636 | A1 * | 1/2010 | Liao | ......................... | A42B 3/04 24/652 |
| 2012/0020656 | A1 * | 1/2012 | Farmer | .................. | F16M 13/04 396/420 |

(Continued)

*Primary Examiner* — Bradley Duckworth
(74) *Attorney, Agent, or Firm* — Peter Loffler

(57) ABSTRACT

A mounting system allows one or more accessories to be removably attached to a SCUBA demand regulator system. A clamp encircles a portion of an air hose subsystem, the clamp having a threaded screw extending therefrom. An accessory is threadably attached to this screw. An extender arm can be sandwiched between this attached accessory and the clamp such that the extender arm has a second threaded screw that threadably receives a second accessory thereonto. One accessory may be a buckle mount that has a mounting surface on one side and a threaded receiver that threadably attaches to one of the screws and is rotated thereonto via a lock down wheel rotatably disposed within the buckle mount. A buoyancy assist subsystem creates either neutral or positive buoyancy to the invention when accessories are mounted.

26 Claims, 9 Drawing Sheets

(56) References Cited

U.S. PATENT DOCUMENTS

| | | | | |
|---|---|---|---|---|
| 2014/0103181 A1* | 4/2014 | Duerigen | ............ | F16M 11/041 |
| | | | | 248/289.11 |
| 2014/0252188 A1* | 9/2014 | Webster | ............... | F16M 13/022 |
| | | | | 248/229.17 |
| 2015/0177597 A1* | 6/2015 | Harrison | .............. | G03B 17/561 |
| | | | | 396/419 |
| 2015/0309396 A1* | 10/2015 | Rohrer | ................ | G03B 17/561 |
| | | | | 224/181 |
| 2015/0316205 A1* | 11/2015 | Bennett | ................ | F16M 13/00 |
| | | | | 224/181 |
| 2016/0058091 A1* | 3/2016 | Sasaki | ..................... | A42B 3/04 |
| | | | | 348/376 |
| 2018/0244359 A1* | 8/2018 | van Dillen | ............ | A63B 31/08 |
| 2019/0359302 A1* | 11/2019 | Shiue | .................... | F16M 13/04 |

\* cited by examiner

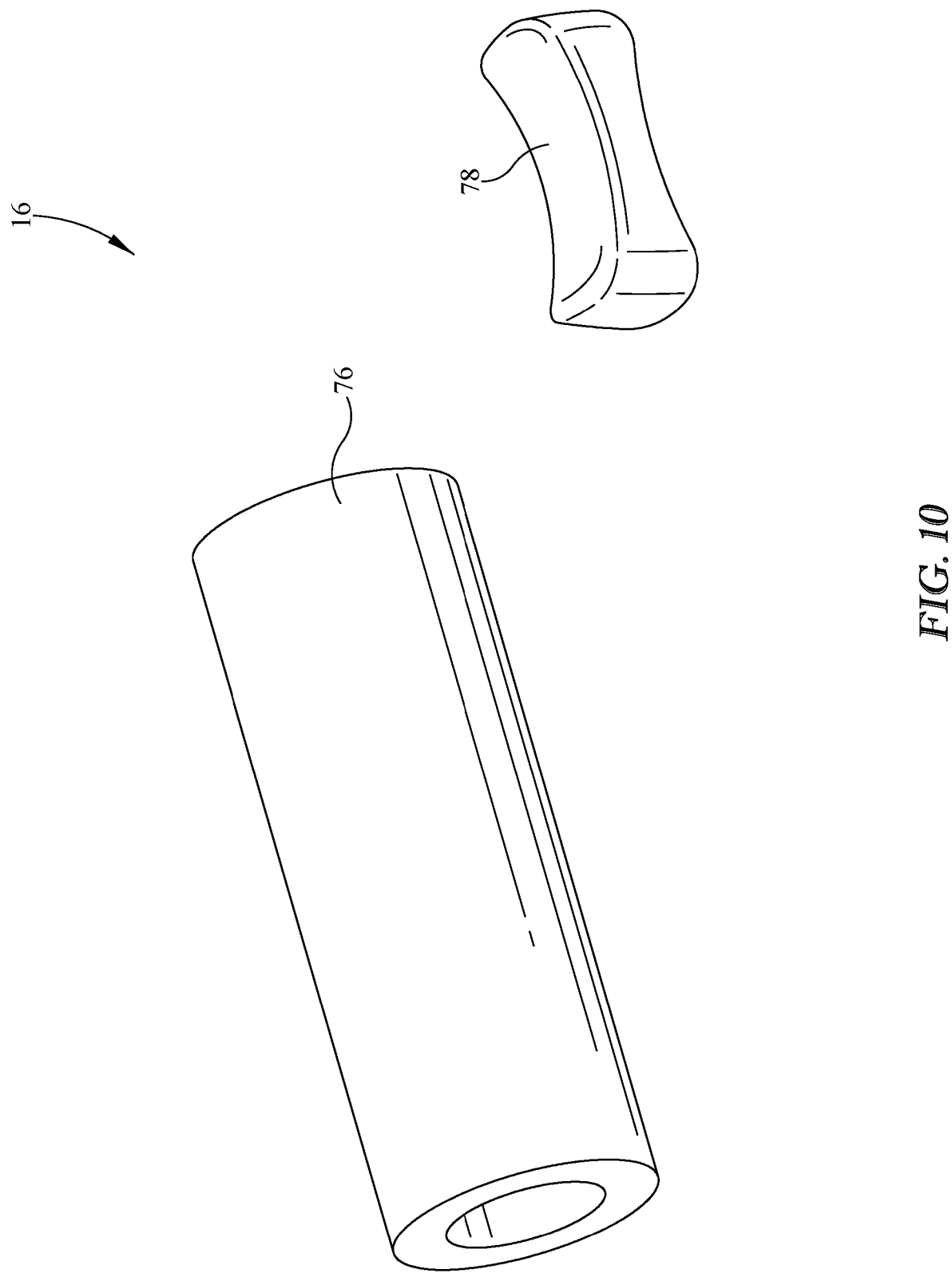

SCUBA REGULATOR SYSTEM MOUNT SYSTEM

BACKGROUND OF THE INVENTION

1. Field of the Invention

The present invention relates to an accessory mount for use by SCUBA (Self-Contained Underwater Breathing Apparatus) divers, wherein the mount is attached to a demand regulator system used by the diver and allows attachment of various items such as cameras and lights thereto.

2. Background of the Prior Art

Recently, there has been an explosion in the production of extreme action videos and still photographs. Photographs and videos are now taken in almost any extreme endeavor including skydiving, SCUBA diving, skiing, mountain biking, motocross racing, zip lining, as well as less extreme endeavors such paddle boarding, and snorkeling. A major contributor to this photographic explosion is the proliferation of small camcorders (often simply called cameras) that produce high definition videos and stills, which camcorders are rugged, fast, easy to use, produce the videos and stills using a wide angle lens, are held within a waterproof housing, and are mountable onto a wide variety of surfaces. The main contender in such camcorders is the HERO® line of cameras produced by GoPro, Incorporated of San Mateo Calif., although other companies produce similar types of cameras. The GoPro cameras are very small, fitting comfortably into the palm of a user's hand, yet are extremely versatile and are loved by extreme sports enthusiasts as well as recreational photographers the world over. The GoPro cameras and others in the field can be attached to a wide variety of mounts, including various helmet mounts, chest mounts, head mounts, handlebar mounts, roll bar mounts, even dog mounts, among others, so that the cameras can be used in almost any setting where a photograph or video is desired in order to capture some stunning moments of an event.

One sport where these extreme action cameras enjoy use is in SCUBA diving. Typically, a SCUBA diver uses a head mount to attach the camera to his or her head and photographs the beauty and variety of the undersea world. While such usage has produced many a stunning video and photograph, there is a certain amount of frustration in head mounting the camera during SCUBA diving. Due to the fact that the camera is being used underwater, the flow of the water and the diver's movement through the water places substantially more force on the camera and mount relative to the forces experienced above the water from the force of the air. As such, the camera can shift or sway without the diver's knowledge so that the diver may have a wonderful array of videos and stills of the top of his or her head. As communication below the water's surface is via hand signals, it is difficult for the diver to assess from others whether or not the camera is mounted properly.

In order to address these needs, I have created a SCUBA regulator mount system, described in U.S. Pat. No. 9,864,258, issued on Jan. 9, 2018, which patent is incorporated herein by reference in its entirety, to address this problem. This previous invention mounted the video accessory to the regulator so as to reduce the hydrodynamic forces on the camera as well as to allow the user to have a constant visual on the camera to assure that the camera remains properly mounted. With continued work on this initial invention, I have further developed SCUBA diving accessory mounting systems.

SUMMARY OF THE INVENTION

The SCUBA regulator system mount system of the present invention continues the work disclosed in my U.S. Pat. No. 9,864,258 by providing a mount for one or more accessories used during SCUBA diving without the need for head mounting. The SCUBA regulator system mount system is mounted such that the hydrodynamic forces acting on the mounted camera do not undersirably shift or sway the attached accessories in order to help assure the diver that the photographs or videos (if a camera is attached) that are attempted to be captured are in fact properly captured. The SCUBA regulator system mount system does not interfere with any of the various safety features of the SCUBA regulator system that may be used by the diver. The SCUBA regulator system mount system is of relatively simple design and construction, being produced using standard manufacturing techniques, so as to be relatively inexpensive to produce so as to be economically attractive to potential consumers for this type of device. The SCUBA regulator system mount system is easy to install, use, and maintain. The adverse effects occasioned by mounting a pair of relatively heavy accessories to the SCUBA regulator system are neutralized by a buoyancy assist device subsystem used by the SCUBA regulator system mount system.

The SCUBA regulator system mount system of the present invention is comprised of a mount clamp that encircles a portion of the air hose subsystem of the SCUBA regulator system (typically at or proximate the air hose to regulator connection juncture) and is clamped thereto. The mount clamp has an inner surface and an outer surface. A first threaded screw extends outwardly from the outer surface of the mount clamp. The mount clamp comprises a first jaw that is pivotally connected to a second jaw. The first jaw and the second jaw articulate between an open position and a closed clamped position. The mount clamp also has a set screw that is threadably secured to a distal end of the first jaw and frictionally engages the second jaw in order to hold the first jaw and the second jaw in the closed position. A pad may be attached to the outer surface of the mount clamp such that the first threaded screw passes through the pad. The pad is made from a rubber or rubber-like material. One or more spacers may be removably attached to the inner surface of the mount clamp such that the spacers are pressed against the air hose subsystem—the spacers being used to accommodate air hose subsystems of differing diameters for a given sized mount clamp. An extender arm allows a second accessory to be attached via the present invention and has a first end that is removably attached to the mount clamp such that the first screw passes through the extender arm. The extender arm also has a second end that is spaced apart from the first and. The second end has a second threaded screw extending therefrom for attachment of a second accessory thereto. A threaded nut is threadably received by the first threaded screw so that the first end of the extender arm is sandwiched between the threaded nut that is screwed onto the first screw and the mount clamp via the pad—the threaded nut frictionally engages the extender arm and holds the extender arm on the mount clamp. Another pad may be attached to the second end of the extender arm such that the second threaded screw passes through this pad. A buckle mount has a housing with a front surface and a rear surface such that a mount buckle (appropriate accessory mount system) is located on the front surface and a female threaded receiver is located on the rear surface. The female threaded receiver threadably receives the first (or second) threaded screw therein. The female threaded receiver is rotated via a lock down wheel that is rotatably disposed within the housing between the front surface and the rear surface in order to rotate the female receiver down onto its received screw. A buoyancy assist device is attached to one or more locations of the SCUBA regulator system. The buoyancy assist device provides either a neutral or a positive buoyancy in water. The buoyancy assist device comprises a hose attachment that encircles a portion of the air hose subsystem and/or a chin stabilizer attachment that is attached to the demand regulator.

BRIEF DESCRIPTION OF THE DRAWINGS

FIG. 10 is a perspective view of the buoyancy assist device components.

Similar reference numerals refer to similar parts throughout the several views of the drawings.

DESCRIPTION OF THE PREFERRED EMBODIMENT

Figure 1:
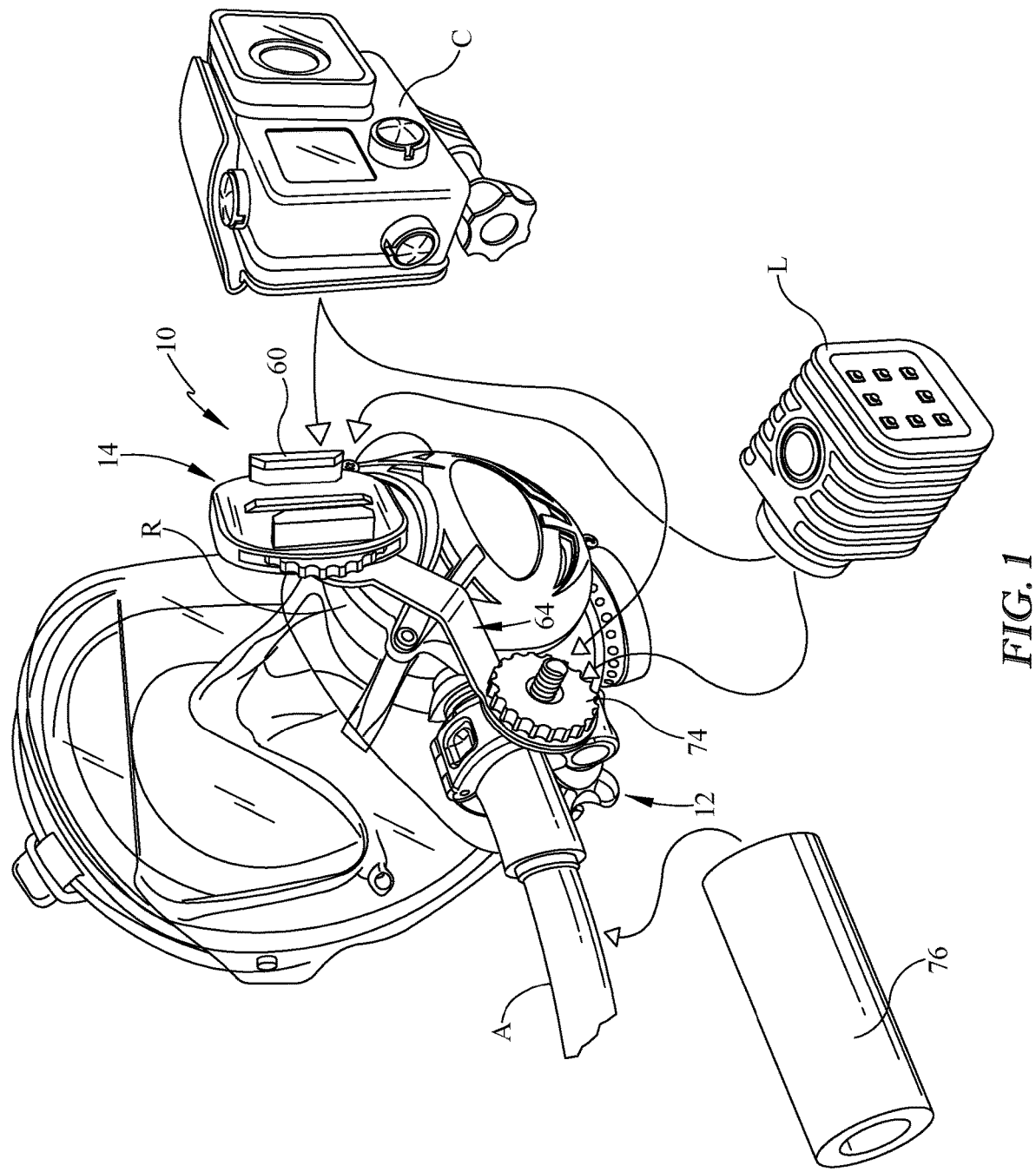
FIG. 1 is perspective view of the SCUBA regulator system mount system of the present invention mounted onto the SCUBA regulator system components and illustrating some of the accessories that can be attached to the invention.
Figure 2:
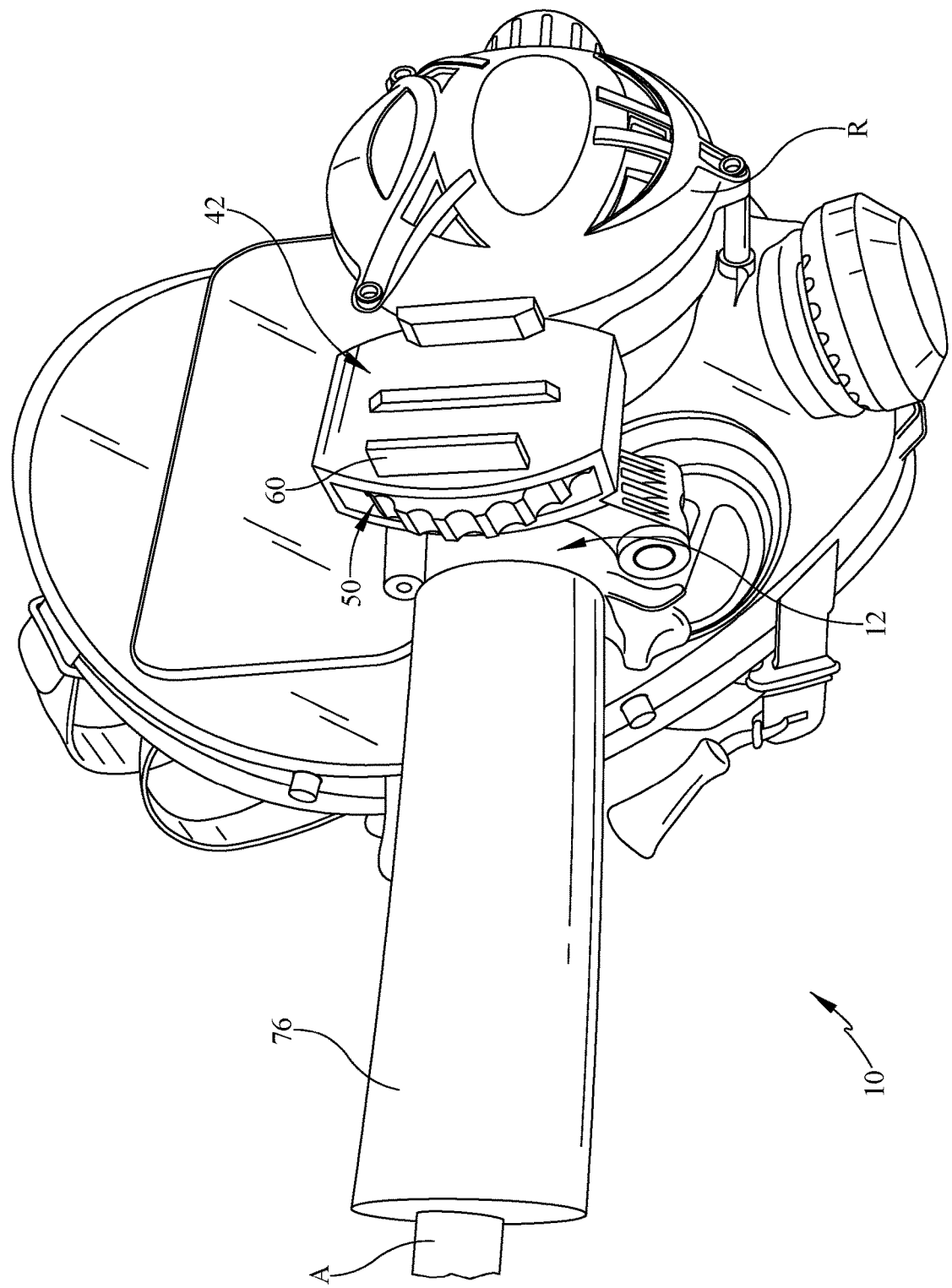
FIG. 2 is perspective view of the SCUBA regulator system mount system illustrating some of the accessories attached to the invention.
Figure 3:
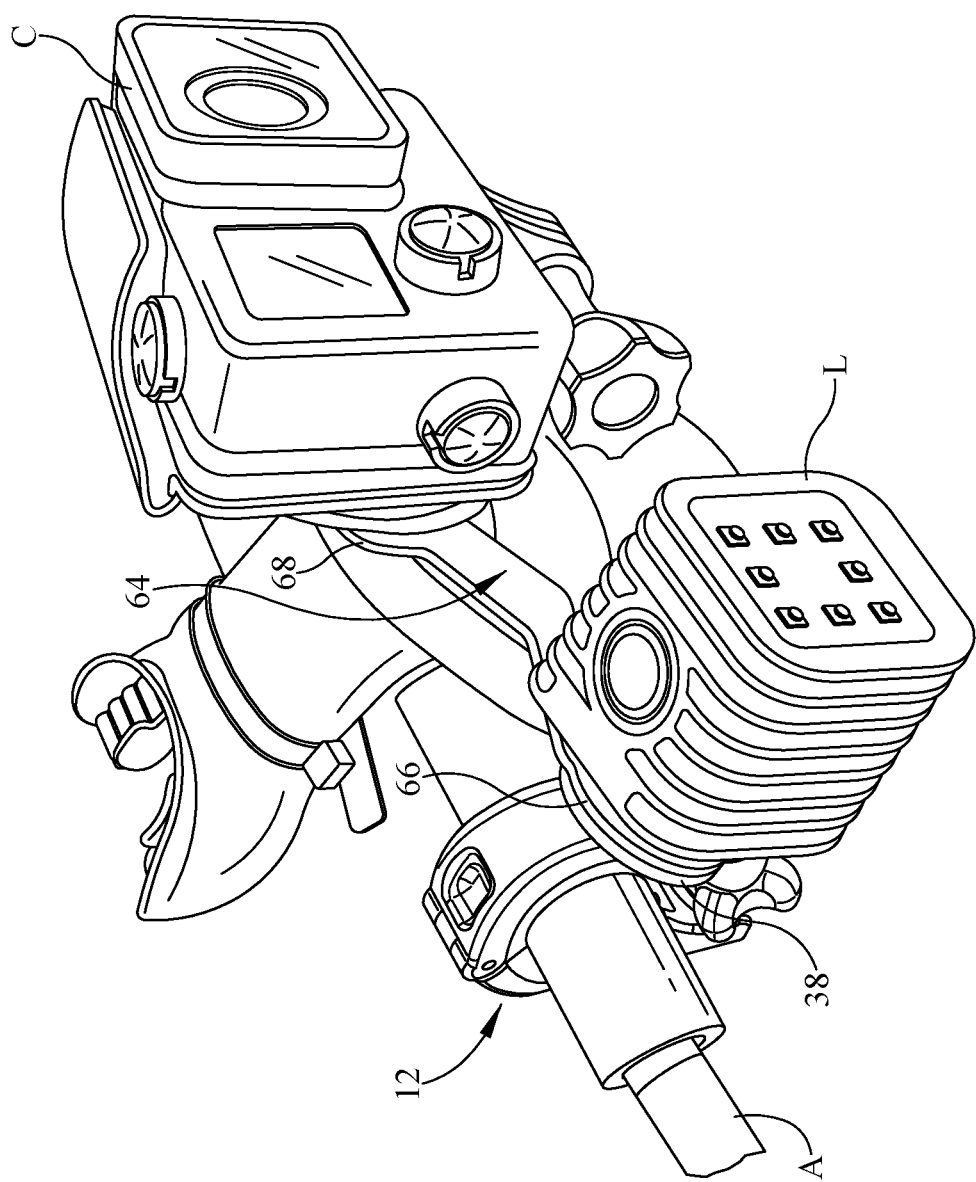
FIG. 3 is a close-up perspective view of the SCUBA regulator system mount system with the accessories mounted onto the SCUBA regulator system components.
Figure 4:
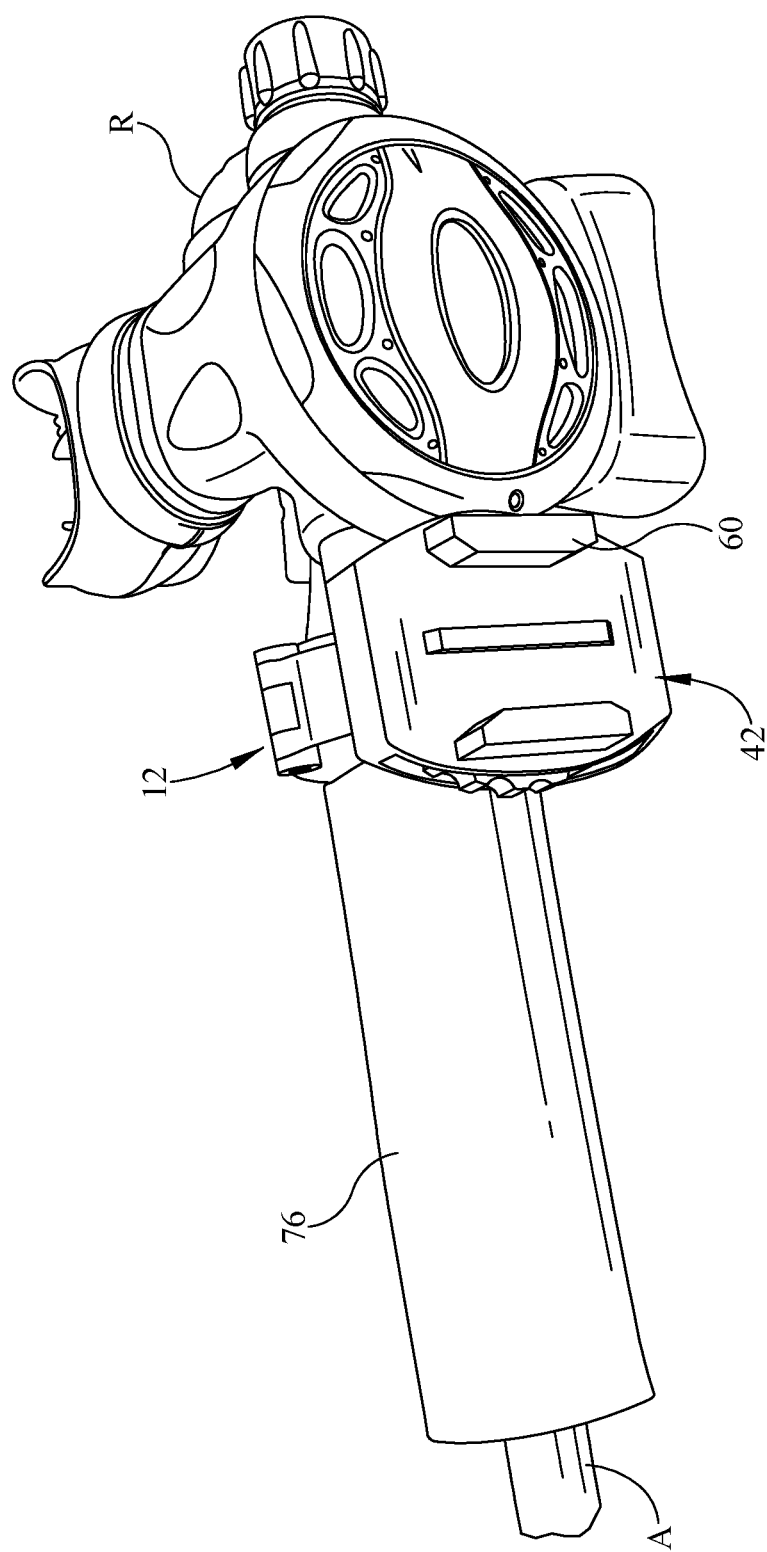
FIG. 4 is a close-up perspective view of the a minimal installation of some of the components of the SCUBA regulator system mount system mounted onto the SCUBA regulator system components.
Figure 5:
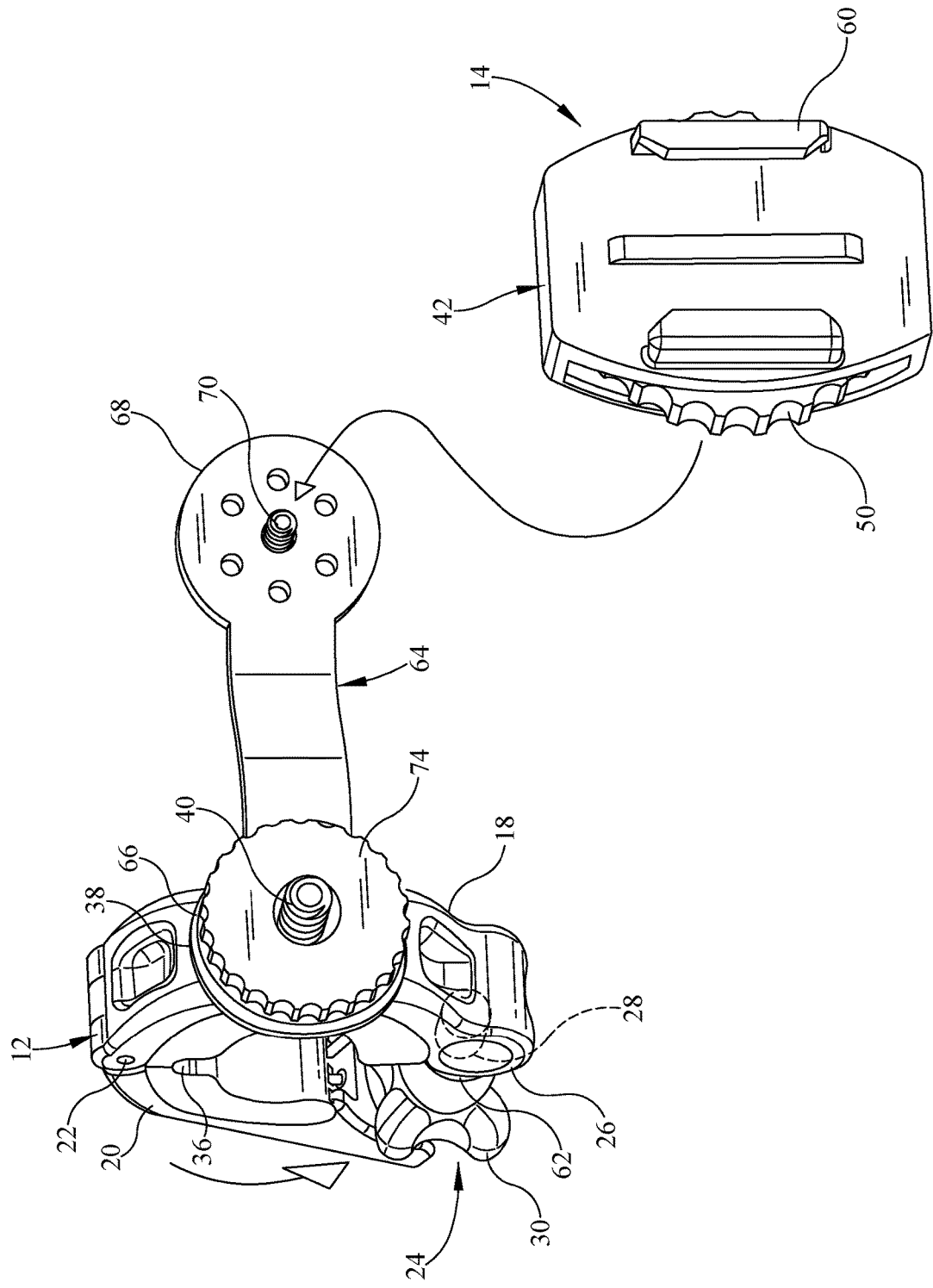
FIG. 5 is a perspective view of the SCUBA regulator system mount system illustrating attachment of the buckle mount.
Figure 6:
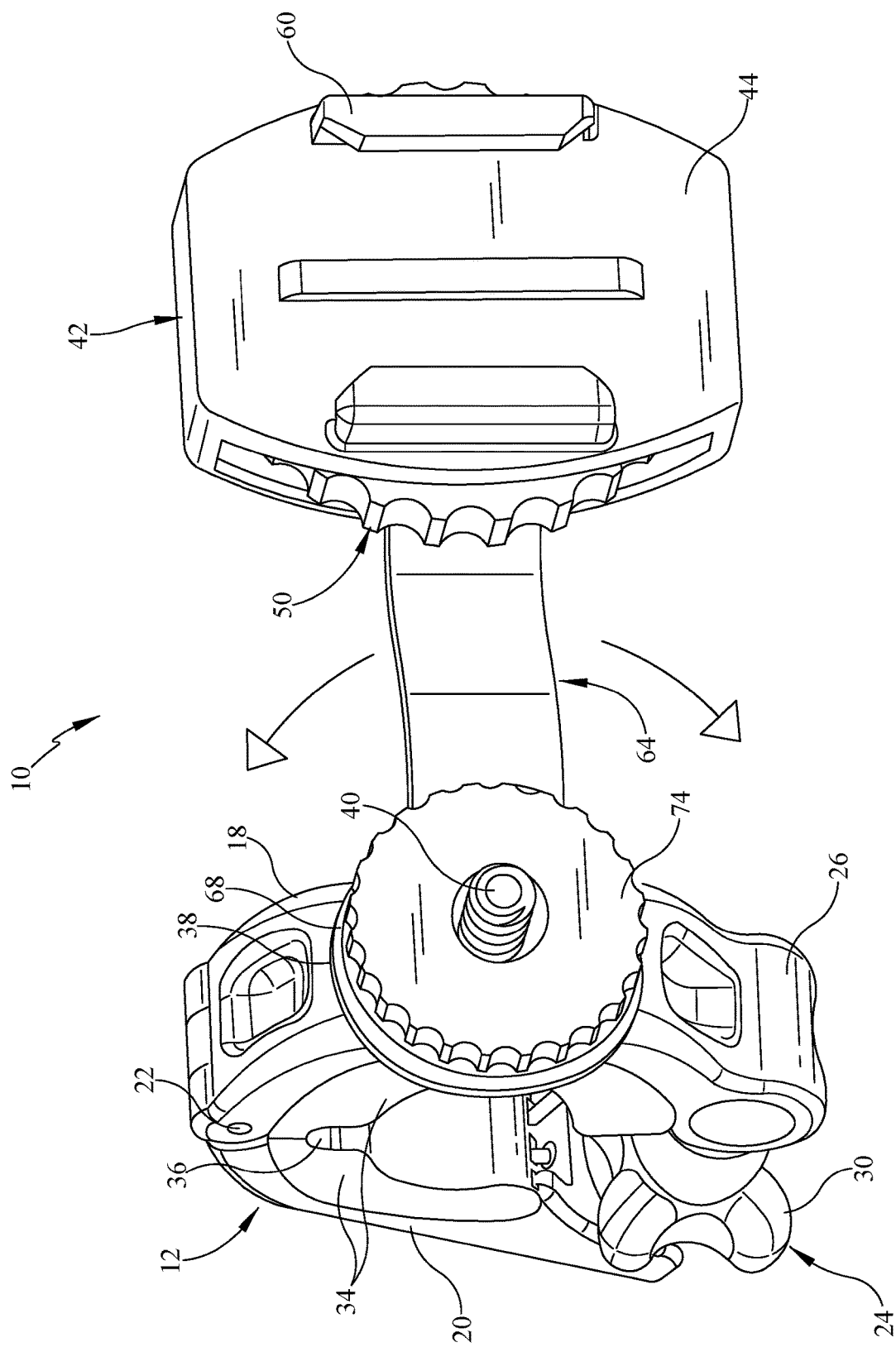
FIG. 6 is a perspective view of the SCUBA regulator system mount system with the buckle mount attached.
Figure 7:
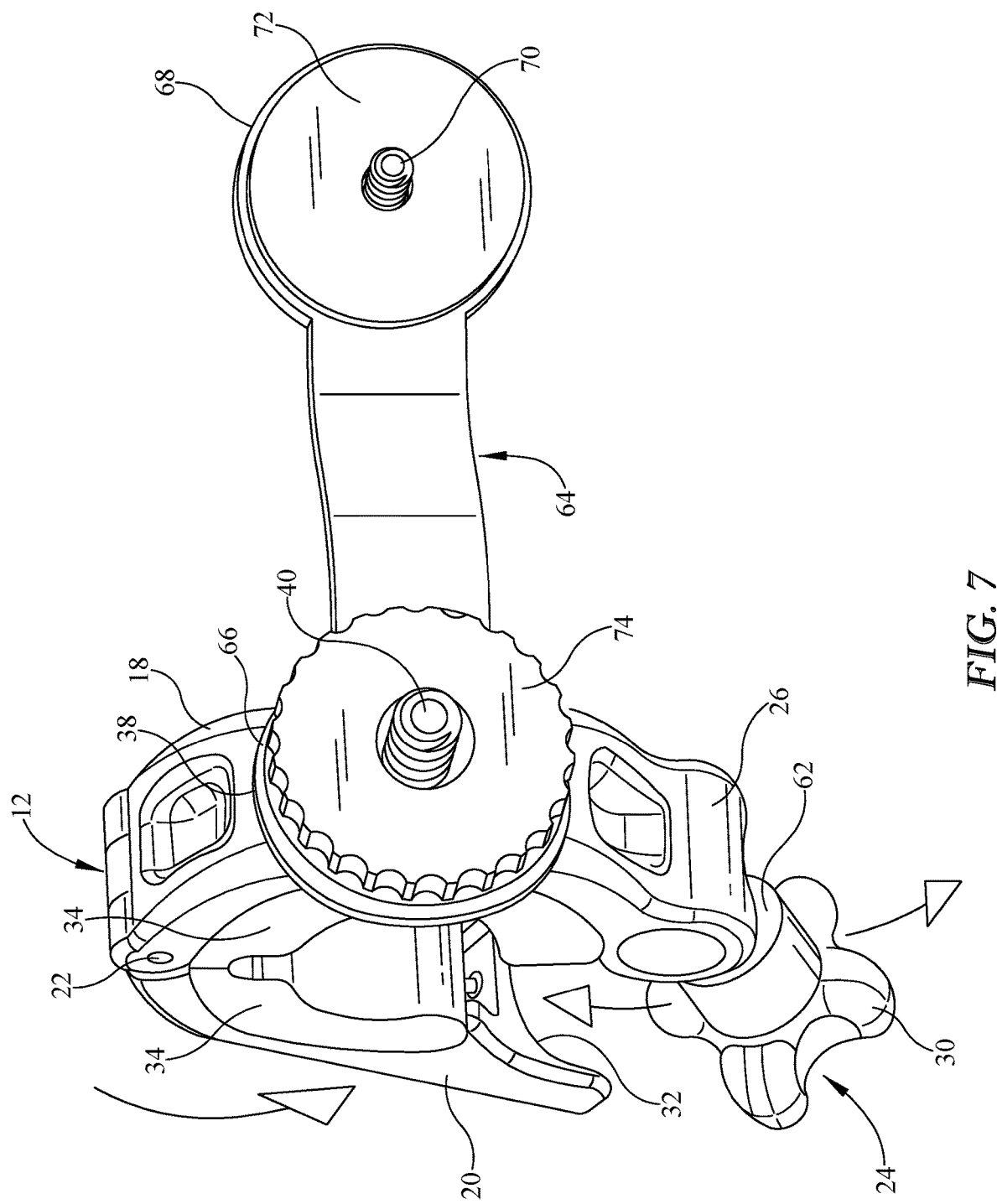
FIG. 7 is a perspective view of the SCUBA regulator system mount system illustrating articulation of the mount clamp.
Figure 9:
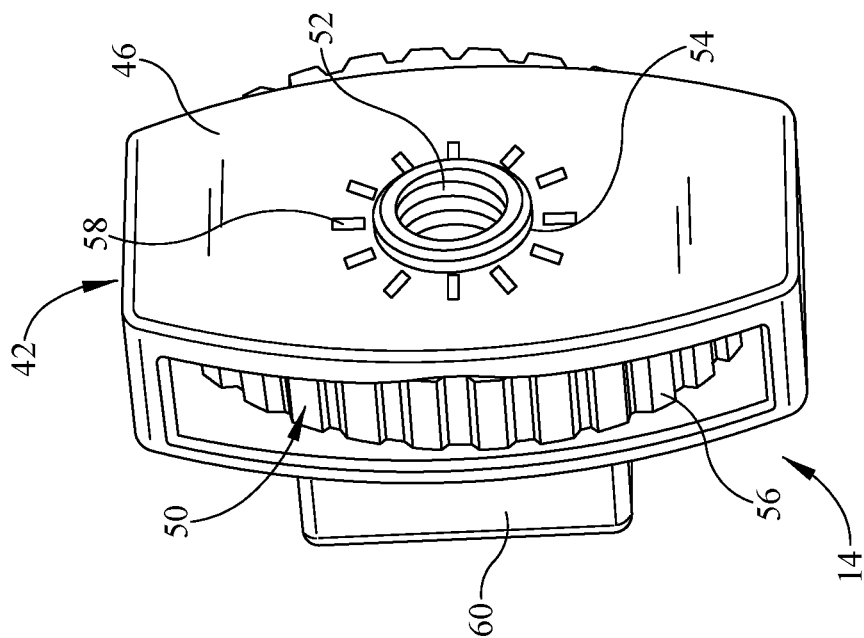
FIG. 9 is a perspective view of the buckle mount with the lock down wheel installed.
Figure 8:
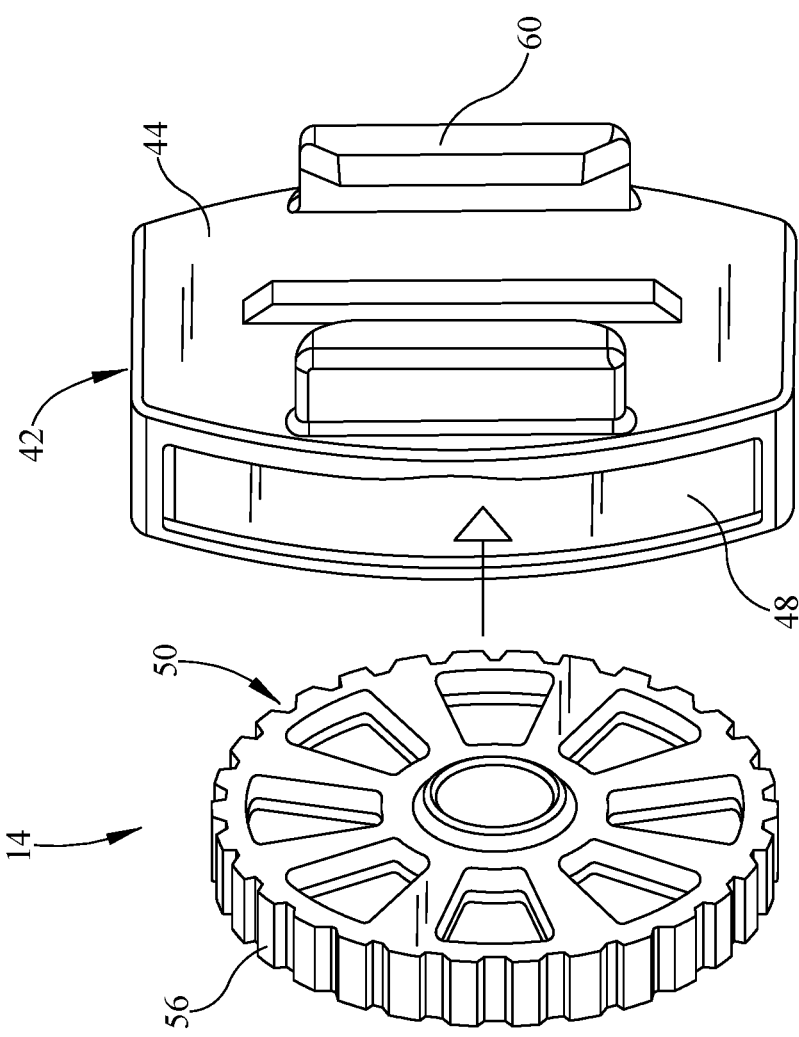
FIG. 8 is a perspective view of the buckle mount with the lock down wheel removed.

Referring now to the drawings, it is seen that the SCUBA regulator system mount system of the present invention, generally denoted by reference numeral 10, is comprised of at least a mount clamp 12, and possibly a buckle mount 14, and buoyancy assist device components 16.

As seen, the mount clamp 12 is a clam shell type of clamp that has a first jaw 18 and a second jaw 20 that is pivotally connected to the first jaw via a hinge pin 22 in order to allow the jaws 18 and 20 of the mount clamp 12 to open and close. As seen, located on the distal end of the first jaw 18 is a threaded set screw 24 that is pivotally attached to this distal end of the first jaw 18 via a screw receiver 26. The set screw 24 has a threaded shaft 28 that is threadably received within the screw receiver 26, the set screw 24 also has a thumb wheel 30 located on the end of the shaft 28 for ease of rotation of the shaft 28 as well as to lock the mount clamp 12 into a closed position as more fully described below. Located on the distal end of the second jaw 20 is a saddle receiver 32. Spacers 34 may be removably attached to the inner surfaces of each of the jaws 18 and 20 in appropriate fashion to allow for attachment of the mount clamp to various sized items. Each spacer 34 may be made from rubber or similar material in order to help protect the surface onto which the mount clamp 12 is attached. As seen, a scalloped region 36 may be formed whereat the spacers 34 abut one another when the mount clamp 12 is in the closed position in order to help prevent pinching of the item onto which the mount clamp 12 is attached. A non-slip pad 38 is located on the outer surface of the first jaw 18, this pad 38 being made from a rubber or similar material or being coated with such material. A threaded first clamp screw 40 extends outwardly from the outer surface of the first jaw 18 and passes through the pad 38. The first clamp screw 40 may be fixedly attached to the outer surface or may be removably attached so as to be interchangeable with different sized screws.

As seen, the buckle mount 14 has a housing 42 that has a front surface 44 and a rear surface 46 and an internal pocket 48 therebetween. A lock down wheel 50 is rotatably disposed within the internal pocket 48 of the housing 42 and has a threaded female receiver 52 that extends through an opening 54 on the rear surface 46 of the housing 42. The outer periphery 56 of the lock down wheel 50 is knurled or otherwise has an appropriate gripping surface in order to allow ease of lock down wheel 50 rotation when under water. As seen, the rear surface 46 of the housing 42 has grip dimples 58 or other appropriate gripping members thereon that encircle the receiver 52 of the lock down wheel 50. As seen, an appropriate mount 60, configured to hold other accessories, such as the illustrated GoPro HERO® camera mount, is located on the front surface 44 of the housing 42 of the mount buckle 14.

In order to use the SCUBA regulator system mount system 10 of the present invention, and in its most basic form, the mount clamp 12 is attached to an appropriate surface of a SCUBA demand regulator system such as to the air hose subsystem A by opening the jaws 18 and 20 of mount clamp 12 and encircling the mount clamp 12 about the air hose subsystem A. The first adjustable clamp screw 40 faces outwardly from the user. When the mount clamp 12 is at the desired position, the jaws 18 and 20 are brought together to close about the air hose subsystem A. Once the jaws 18 and 20 are closed, the mount clamp 12 is locked into position by pivoting the set screw 24 until the shaft 28 of the set screw 24 is seated within the saddle receiver 32 located on the distal end of the second jaw 20. Thereafter, the shaft 28 of the set screw 24 is rotated via the thumb wheel 30 until its lower surface 62 presses against an outer surface of the saddle receiver 32 with sufficient pressure so as to frictionally hold the two jaws 18 and 20 of the mount clamp 12 together in the closed position. In order to open the jaws 18 and 20 of the mount clamp 12, the shaft 28 is counter-rotated until the shaft 28 can be pivoted out of the saddle receiver 32 thereby allowing the jaws 18 and 20 to pivot with respect to one another. The mount clamp 12 is now installed and can have an accessory attached thereto. For example, a light L can be directly threadably attached to the first adjustable clamp screw 40 via the camera's threaded receiver F located on its rear surface such that the camera's receiver F threadably receives the first adjustable clamp screw 40. Alternately, the buckle mount 14 can be attached to the mount clamp 12 by having the female receiver 52 of the lock down wheel 50 of the buckle mount 14 receive the first adjustable clamp screw 40. Once the female receiver 52 of the lock down wheel 50 receives the distal end of the first adjustable clamp screw 40, the lock down wheel 50 is rotated in order to complete the threaded attachment of the buckle mount 14 to the mount clamp 12. By using the lock down wheel 50 to complete the threaded attachment of the buckle mount 14 to the mount clamp 12, there is no need to rotate the entire buckle mount 14 when achieving this threaded attachment which may be critical in tight quarters especially when an object, such as the illustrated GoPro HERO® C is secured to the buckle mount 14. Other accessories can be attached to the mount 60 depending on the particular configuration of the mount 60. The user can now SCUBA dive as desired with the desired accessory mounted and facing forward in the same direction as the face of the user without the need to use his or her hands to hold the accessory. The non-slip pad 38 is pressed between the accessory and the first jaw 18, which helps eliminate unwanted movement and vibration of the accessory so attached.

If the mounting of an additional accessory is desired, then an extender arm 64 is deployed. As seen, the extender arm 64 is a generally elongate plate like member that is either flat or has one or more bends therealong. As seen, the extender arm 64 has an expanded first end 66 that has an opening (not illustrated) thereat and also has an expanded second end 68 that has a threaded second adjustable clamp screw 70 extending therefrom. The second end 68 may have the illustrated a rubber or similar grip pad 72 (the second adjustable clamp screw 70 passing through the grip pad 72), grip dimples (not illustrated) or other grip surface thereon.

In order to use the extender arm 64, the extender arm 64 is positioned so that the first adjustable clamp screw 40 passes through the opening located on the first expanded end 66 of the extender arm 64. The extender arm 64 is secured thereto by threadably attaching a thumb nut 74 onto the first adjustable clamp screw 40. The thumb nut 74 is rotated until it presses and secures the extender arm 64 against the non-slip pad 38. The first adjustable clamp screw 40 is sufficiently long so as to protrude through the thumb nut 74 a sufficient distance so as to allow an accessory to be threadably attached thereto as previously described. It is recognized that the extender arm may have a threaded screw boss on the first expanded end instead of the opening, which screw boss would be open on both ends (or have one end with external threading and extending above the first expanded end so as to be able to threadably receive an accessory) and which would allow the expander arm to be threadably attached to the first adjustable clamp screw 40 without the need for the thumb nut, however, in such a configuration, the entire extender arm would need to be rotated several revolutions to properly threadably attach the extender arm to the first adjustable clamp screw 40 of the mount clamp 12 and have sufficient first adjustable clamp screw protrusion out of the extender arm. This may prove awkward at best or potentially even impossible in tight quarters when the mount clamp 12 is already attached, especially if an accessory is already secured to the extender arm as discussed next.

The accessory, such as the light L or the buckle mount 14, is threadably attached to the second adjustable clamp screw 70 in the same manner as attachment to the first adjustable clamp screw 40. The grip pad 72 is pressed between the accessory and the second expanded end 68, which helps eliminate unwanted movement and vibration of the accessory so attached.

If the user desires to radially adjust the position of the accessory attached to the extender arm 64, the thumb nut 74 is rotated so as to be slightly loosened (this can be accomplished without the need to remove any accessory attached to the first adjustable clamp screw 40) and the extender arm 64 is rotated to the desired position and the thumb nut 74 is once again tightened.

The SCUBA regulator system mount system 10 can be attached to almost any SCUBA demand regulator system including full face mask regulator systems, side exhaust regulator systems, as well as standard regulator systems. When the SCUBA regulator system mount system is properly attached to the SCUBA demand regulator system, neither the SCUBA regulator system mount system 10 nor the attached accessories are positioned in front of the purge of the regulator R. All components of the SCUBA regulator system mount system 10, unless specifically described otherwise, are made from an appropriate material for use in underwater diving such as stainless steel, strong plastic, or other similar material.

The attachment of two accessories via the SCUBA regulator system mount system 10 can create substantial additional weight for the user. As such, buoyancy assist device components can be added. One such component is a hose attachment 76 which is a short tubular member that encircles the air hose subsystem A of the demand regulator system proximate the attachment point of the mount clamp 12 (the mount clamp 12 can also encircle the hose attachment 76 in its attachment to the air hose subsystem A of the demand regulator system. A chin stabilizer 78 is adhesively attached to an appropriate surface of the SCUBA regulator system in order to allow the user to position his or her chin on the chin stabilizer 78 when donning the SCUBA demand regulator system. The hose attachment 76 and chin stabilizer 78 are each made from an appropriate material that has positive buoyancy, such as close cell foam, and when installed along with the SCUBA regulator system mount system 10, gives the overall SCUBA demand regulator system neutral to positive buoyancy.

While the invention has been particularly shown and described with reference to an embodiment thereof, it will be appreciated by those skilled in the art that various changes in form and detail may be made without departing from the spirit and scope of the invention.

I claim:

1. A mount system attachable to a SCUBA (Self-Contained Underwater Breathing Apparatus) demand regulator system, the SCUBA demand regulator system comprises an air hose subsystem connected to a demand regulator, the mount system comprising:
 a mount clamp that is adapted to encircle a portion of the air hose subsystem and attach thereonto, the mount clamp having an inner surface and an outer surface; and
 a first threaded screw extending outwardly from the outer surface of the mount clamp.

2. The mount system as in claim 1 such that the mount clamp has a first jaw pivotally connected to a second jaw, the first jaw and the second jaw articulate between an open position and a closed position, the mount clamp also having a set screw threadably secured to the first jaw and frictionally engaging the second jaw in order to hold the first jaw and the second jaw in the closed position.

3. The mount system as in claim 1 further comprising a pad attached to the outer surface of the mount clamp such that the first threaded screw passes through the pad.

4. The mount system as in claim 3 wherein the pad is made from a rubber or rubber-like material.

5. The mount system as in claim 1 further comprising a spacer removably attached to the inner surface of the mount clamp such that the spacer is pressed against the air hose subsystem.

6. The mount system as in claim 1 further comprising an extender arm having a first end that is removably attached to the mount clamp such that the first threaded screw passes through the extender arm, the extender arm also having a second end that is spaced apart from the first end and, the second end having a second threaded screw extending therefrom.

7. The mount system as in claim 6 further comprising a threaded nut that is threadably received by the first threaded screw so that the first end of the extender arm is sandwiched between the threaded nut and the mount clamp.

8. The mount system as in claim 6 further comprising a pad attached to the second end of the extender arm such that the second threaded screw passes through the pad.

9. The mount system as in claim 1 further comprising a buckle mount having a housing with a front surface and a rear surface such that a mount buckle is located on the front surface and a female threaded receiver is located on the rear surface, the female threaded receiver receiving the first threaded screw therein.

10. The mount system as in claim 9 wherein the female threaded receiver is rotated via a lock down wheel rotatably disposed within the housing between the front surface and the rear surface.

11. The mount system as in claim 1 further comprising a buoyancy assist device adapted to be attached to the SCUBA demand regulator system, the buoyancy assist device having a positive buoyancy in water.

12. The mount system as in claim 11 wherein the buoyancy assist device comprises a hose attachment that is adapted to encircle a portion of the air hose subsystem.

13. The mount system as in claim 11 wherein the buoyancy assist device comprises a chin stabilizer that is adapted to be attached to the demand regulator.

14. The mount system as in claim 1 in combination with the SCUBA demand regulator system.

15. The mount system as in claim 14 wherein the mount clamp has a first jaw pivotally connected to a second jaw, the first jaw and the second jaw articulate between an open position and a closed position, the mount clamp also having a set screw threadably secured to the first jaw and frictionally engaging the second jaw in order to hold the first jaw and the second jaw in the closed position.

16. The mount system as in claim 14 further comprising a pad attached to the outer surface of the mount clamp such that the first threaded screw passes through the pad.

17. The mount system as in claim 16 wherein the pad is made from a rubber or rubber-like material.

18. The mount system as in claim 14 further comprising a spacer removably attached to the inner surface of the mount clamp such that the spacer is pressed against the air hose subsystem.

19. The mount system as in claim 14 further comprising an extender arm having a first end that is removably attached to the mount clamp such that the first threaded screw passes through the extender arm, the extender arm also having a second end that is spaced apart from the first end and, the second end having a second threaded screw extending therefrom.

20. The mount system as in claim 19 further comprising a threaded nut that is threadably received by the first threaded screw so that the first end of the extender arm is sandwiched between the threaded nut and the mount clamp.

21. The mount system as in claim 19 further comprising a pad attached to the second end of the extender arm such that the second threaded screw passes through the pad.

22. The mount system as in claim 14 further comprising a buckle mount having a housing with a front surface and a rear surface such that a mount buckle is located on the front surface and a female threaded receiver is located on the rear surface, the female threaded receiver receiving the first threaded screw therein.

23. The mount system as in claim 22 wherein the female threaded receiver is rotated via a lock down wheel rotatably disposed within the housing between the front surface and the rear surface.

24. The mount system as in claim 14 further comprising a buoyancy assist device adapted to be attached to the SCUBA demand regulator system, the buoyancy assist device having a positive buoyancy in water.

25. The mount system as in claim 24 wherein the buoyancy assist device comprises a hose attachment that is adapted to encircle a portion of the air hose.

26. The mount system as in claim 24 wherein the buoyancy assist device comprises a chin stabilizer that is adapted to be attached to the demand regulator.

\* \* \* \* \*